United States Patent [19]
Linzer

[11] Patent Number: 6,115,076
[45] Date of Patent: Sep. 5, 2000

[54] COMPRESSED VIDEO RECORDING DEVICE WITH NON-DESTRUCTIVE EFFECTS ADDITION

[75] Inventor: Elliot Linzer, Bronx, N.Y.

[73] Assignee: C-Cube Semiconductor II, Inc., Milpitas, Calif.

[21] Appl. No.: 09/295,610

[22] Filed: Apr. 20, 1999

[51] Int. Cl.[7] .................................................. H04N 9/74
[52] U.S. Cl. ..................... 348/578; 348/239; 348/595; 348/594
[58] Field of Search ................................. 348/239, 578, 348/594, 595; 382/233, 235, 248, 250; H04N 9/74

[56] References Cited

U.S. PATENT DOCUMENTS 5,802,210   9/1998   Kurata ..................................... 348/578

*Primary Examiner*—Sherrie Hsia
*Attorney, Agent, or Firm*—Proskauer Rose LLP

[57] ABSTRACT

A method and system are provided for capturing and compressing an original uncompressed video signal which enables decoding and reversible reconstruction of a decompressed version of the original video signal. The system includes an input for receiving a signal indicating a special effect operation by which a first frame of a video signal is irreversibly transformed to a special effect frame. This is achieved by combining decompressed frame pixel data of the first frame with information comprising either pixel data of a second frame or a single scaling value to be used to scale plural pixels of a frame. The information indicates a special effect operation which can be performed on decompressed pixel data of the first frame to produce a special effect frame (e.g., the information can include a separate indicator specifying a specific operation or the information by its mere presence can indicate the special effect operation). The system also includes a processor for compressing pixel data of the first frame. The processor is also for constructing a bitstream containing the compressed pixel data of the first frame and the information. The bitstream is decompressible in a first manner to reproduce a decompressed video signal including the special effect frame, produced by performing the indicated special effect operation, in place of the first frame. The bitstream is also decompressible in a second manner to produce a decompressed version of the video signal with the first frame and without the special effect frame. The system and method according to this embodiment form a novel bitstream containing the compressed video frames and the information which can be stored on a storage medium. A system is also provided with a demultiplexer, decompressor and special effects generator for presenting the video signal with or without the special effect.

18 Claims, 3 Drawing Sheets

COMPRESSED VIDEO RECORDING DEVICE WITH NON-DESTRUCTIVE EFFECTS ADDITION

RELATED APPLICATIONS

This application is related to the following patent application:

(1) U.S. patent application Ser. No. 09/295,609, entitled "Compressed Video Recording Device With Integrated Effects Processing," filed on even date herewith for Elliot Linzer.

The above-listed patent application is assigned to the same assignee as this application and is incorporated herein by reference.

FIELD OF THE INVENTION

The present invention pertains to video compression and special effects video generation, such as fades, dissolves, wipes, graphics overlays, etc.

BACKGROUND OF THE INVENTION

FIG. 1 illustrates a convention video camera recording system 10. Light representing an image impinges on a sensor 12, such as a photo-tube, charge-coupled device or CMOS photo sensor. The sensor 12 converts the light signal to an electrical video signal representing the image. The video signal is received at an effects processor 14 which also receives control signals. The effect processor 14 processes the video signal to produce one or more special effects. Some examples of special effects include, a fade in or fade out, where the brightness of the output video signal is gradually increased from black or reduced to black. Another special effect is a dissolve, where a gradual fade from one scene to another scene is accomplished. Other special effects include wipes and graphics overlays.

Often, the effect to be achieved is a mathematical operation on the pixel values of two different frames. For example, a dissolve may be achieved using the formula $F_0(t)=\alpha \cdot F_1(t)-(1-\alpha(t))\cdot F_2(t)$ where $F_0(t)$ is an output frame, $F_1(t)$ is a frame from which the dissolve begins, $F_2(t)$ is a frame on which the dissolve ends, t is a frame interval, and $\alpha(t)$ is a monotonically decreasing function having a value that starts at 1 and gradually decreases to 0 at a finite frame interval t>0. To perform the special effect, the effects processor 14 is able to store one or more frames in a memory 16.

The effects processed video signal, i.e., the uncompressed frames as processed (if at all) by the effects processor 14, are outputted to a compressor 18. If necessary, the compressor 18 first digitizes the frames and/or strips the synchronization signals from the frames, such as the horizontal and vertical blanking interval information. The compressor 18 compresses the frames of the effects processed video signal to produce a compressed video signal. A variety of compression techniques can be used to compress the video signal including MPEG-1, MPEG-2, motion JPEG and DVC.

As is well known, MPEG-2 video compression is a combination of spatial and temporal compression to remove spatial and temporal redundancy, respectively, in a sequence of moving pictures (fields or frames). According to MPEG-2, (the luminance data of) a to-be-compressed picture is divided into two-dimensional (e.g., 16×16) arrays of pixels called macroblocks. Temporal compression includes the steps of identifying a prediction macroblock for one or more of the macroblocks of the to-be-compressed picture. The prediction macroblock is a macroblock in another picture, called a reference picture, identified by a motion vector. A prediction error macroblock is formed by subtracting the prediction macroblock from the to-be-compressed macroblock. The prediction error macroblock thus formed is then spatially compressed.

In spatial compression, each macroblock is divided into smaller blocks (e.g., 8×8 arrays of pixels). The blocks are discrete cosine transformed, quantized, scanned into a sequence of coefficients and entropy encoded. Spatial compression is applied to both prediction error macroblocks and also non-temporally compressed macroblocks, i.e., original macroblocks of the to-be-compressed pictures. Macroblocks of the to-be-compressed picture which are only spatially compressed are referred to as intracoded macroblocks and macroblocks of the to-be-compressed picture which are both spatially and temporally compressed are referred to as interceded macroblocks. The spatially compressed picture data and motion vectors, as well as other control information, is then formatted into a bitstream according to the MPEG-2 syntax. Pictures designated as reference pictures are furthermore decompressed and stored locally so that they can be used for forming predictions.

Compressed pictures are organized into groups of pictures and the groups of pictures are organized into sequences. A group of pictures begins on an I picture or intracoded picture. The macroblocks of I pictures are only spatially compressed. I pictures are used as reference pictures for forming predictions of other pictures. The group of pictures may also have P pictures or forward predicted compressed pictures. Prediction macroblocks for P pictures can be selected from only a preceding reference picture. The P picture may also contain intracoded macroblocks (if adequate prediction macroblocks cannot be found therefor). P pictures are also used as reference pictures for forming predictions of other pictures. Finally, the group of pictures can also have B pictures or bidirectionally predicted compressed pictures. Prediction macroblocks for B pictures can be selected from a preceding reference picture, a succeeding reference picture or from both preceding and succeeding reference pictures (in which case the multiple prediction macroblocks are interpolated to form a single prediction macroblock). A B picture can also have intracoded macroblocks (if an adequate prediction cannot be found therefor).

Compressed frame data formed according to the MPEG-2 standard produces a variable number of bits per picture. The amount of compressed picture data must be carefully controlled relative to the rate of transfer of such information to a decoder and the size of a buffer of the decoder to prevent the decoder buffer from underflowing and, under certain circumstances, to prevent the decoder buffer from overflowing. To that end, a bit budget may be established for each picture which may be adjusted from time to time according to a presumed decoder buffer fullness. Bit budgets can be met by controlling quantization (most notably, the quantization scale factor which controls the coarseness of quantization), amongst other aspects of compression.

Compressed picture data formed according to the MPEG-2 standard may be placed into program elementary stream (PES) packets. PES packets may also be formed for other elementary streams such as a compressed audio stream, a closed captioning text stream, etc., associated with the same video program. In the case of authoring a video program for playback in a controlled (i.e., halt-able) playback environment, such as a CD, DVD, etc., the PES packets may be organized into packs and stored on a storage medium or record carrier. Other navigational information indicating how to read back the packs to construct the video program may also be recorded on the storage medium. In the case of creating a video program in a non-controlled environment, such as for broadcast over a noisy channel where the receiver might not be able to temporarily suspend or halt the flow of data, the data of the PES packets may be inserted into transport packets of fixed length. The transport packets containing elementary stream data for one or more video programs are then multiplexed togther to form a transport stream. Transport packets containing various kinds of program specific information, such a program association table and a program mapping table for identifying the transport packets carrying each elementary stream of a particular video program, may be also multiplexed into the transport stream.

As noted above, in the course of compressing the video signals, one or more reference frames may be stored in a second memory 20. In addition, the memory 20 is typically needed to format the compressed video signal into an appropriate form for output according to the standard syntax of the compression technique used to compress the video signal, i.e., into blocks, macroblocks, slices, pictures, groups of pictures, sequences, etc., including all appropriate header and control information. The compressed video signal thus formed is then read out of the memory 20 and stored on a suitable high storage capacity storage device 22 such as a magnetic tape, magnetic disk, optical disc, etc.

There are a number of problems associated with the video recording system 10. First, the recording system 10 requires two separate memory circuits 16 and 20. The memory circuits 16 and 20 are each typically formed using separate DRAM or SDRAM integrated circuits. As such, the cost of the overall system 10 is high.

Second, compression and effects processing are performed independently. This is disadvantageous because different special effects can impact compression performance but no such indication of the type of special effect performed on the uncompressed frames is provided to the compressor so as to compensate for, or take advantage of, such a priori special effects information. For example, a fade is achieved by a gradual change of pixel luminance intensity over a sequence of frames. Such changes in luminance intensity tend to lessen the ability to find an accurate predictor in a (decompressed) reference frame for a to-be-compressed frame. The same is true for dissolves.

Third, once the special effect has been performed on a video frame, it is impossible to "undo" or reverse the special effect and recover the original frame. Specifically, a fade in or fade out permanently changes the luminance data of the frame. A dissolve permanently changes both the luminance and chrominance data. In a similar fashion, a wipe replaces pixel data of another video signal with pixel data of the post-wipe video signal overlaid thereon.

It is an object of the present invention to overcome the disadvantages of the prior art.

SUMMARY OF THE INVENTION

The present invention achieves this, as well as other, objects. According to one embodiment, a method and system are provided for real-time special effects processing, compressing and storing video signals. A memory is provided for storing plural frames including a sequence of one or more uncompressed frames. One or more processors are also provided for forming a sequence of special effect frames. Each special effect frame is a combination of one uncompressed frame (stored in the memory) and frame data other than the uncompressed frame (which combination can be a linear combination). The processor(s) also compresses the special effect frame.

Illustratively, the uncompressed frame is one of a sequence of frames captured in real time from a sensor such as a photo-tube, charge coupled device or CMOS photo sensor. As each picture is captured, it is stored in the memory pending special effects and compression processing by the processor. Compressed special effects frames produced by the processor may be stored in a high capacity storage device such as a video tape recorder, magnetic disk or optical disc.

Illustratively, different kinds of special effects can be achieved by the system according to the invention. For example, the special effect can be a fade-in or fade-out. In such a case, the special effects frame illustratively is formed as a linear combination by scaling the uncompressed data frame, scaling uniform color (e.g., black) frame data and adding the two together. In another example, the special effect is a dissolve. In this case, the special effects frame illustratively is formed as a linear combination of the scaled captured frame and an inverse scaling of another frame of another sequence (e.g., a previously captured frame). The system can also achieve a wipe special effect. In this case, the special effects frame is formed as certain selected pixels from the captured frame in corresponding pixel positions of the special effects frame and selected pixels from a second frame (such as a previously captured frame of another sequence) in other corresponding pixel positions of the special effects frame. In yet another example, the special effect is a graphics overlay. In this case, the special effect frame is formed using a similar pixel selection process as in the wipe although the graphics overlay can be artificially generated pixel data (e.g., as created by a character generator) and the selection of pixels is typically constant over a sequence of plural special effects frames.

According to another embodiment, another method and system are provided for real-time special effects processing, compressing and storing video signals. The system includes an input for receiving a signal requesting a special effect to be performed on an least one uncompressed frame and other frame data. A processor is also provided which responds to the received signal. In response, the processor forms a special effect frame as a particular combination of the uncompressed frame and the other frame data as requested by the signal. The processor also compresses the special effect frame to produce a compressed frame. Moreover, the processor varies the compression of the special effect frame in dependence on the received signal.

Thus, the system and method according to the second embodiment exploit a priori knowledge about the properties of the to-be-compressed special effects frame. For example, it is difficult to perform motion estimation on a sequence of video frames of a fade or dissolve. Using a priori knowledge that the to be compressed special effects frame depicts a fade or dissolve, compression can be optimized by reducing the motion estimation search window. In the case of a graphics overlay, it may be desirable to decrease the quantization scale factor in the portion of the special effects frame containing pixel data of the overlaid graphics. Other compression variations include changing the picture structure, using field based compression, varying the number of inter-coded pictures between each reference picture, and allocating different numbers of bits to each to-be-compressed frame.

According to a third embodiment, a method and system are provided for capturing and compressing an original uncompressed video signal which enables decoding and reversible reconstruction of a decompressed version of the original video signal. The system includes an input for receiving a signal indicating a special effect operation by which a first frame of a video signal is irreversibly transformed to a special effect frame. This is achieved by combining decompressed frame pixel data of the first frame with information comprising either pixel data of a second frame or a single scaling value to be used to scale plural pixels of a frame. The information indicates a special effect operation which can be performed on decompressed pixel data of the first frame to produce a special effect frame (e.g., the information can include a separate indicator specifying a specific operation or the information by its mere presence can indicate the special effect operation). The system also includes a processor for compressing pixel data of the first frame. The processor is also for constructing a bitstream containing the compressed pixel data of the first frame and the information. The bitstream is decompressible in a first manner to reproduce a decompressed video signal including the special effect frame, produced by performing the indicated special effect operation, in place of the first frame. The bitstream is also decompressible in a second manner to produce a decompressed version of the video signal with the first frame and without the special effect frame.

The system and method according to this embodiment form a novel bitstream containing the compressed video frames and the information. Such a bitstream can be recorded on a storage medium or transmitted.

An apparatus is also provided for decompression and special effects generation according to another embodiment. The apparatus has a demultiplexer for demultiplexing from the bitstream: (a) compressed pixel data of a first frame of a video signal and (b) information comprising either pixel data of a second frame or a single scaling value to be used to scale plural pixel data of a frame. Again, the information indicates a special effect operation by which the first frame is irreversibly transformed to a special effect frame by combining decompressed pixel data of the first frame with the first information. The system also includes a decompressor for decompressing the pixel data of the first frame to produce decompressed pixel data of the first frame. The system furthermore includes a special effects generator for receiving a mode signal specifying one of two presentation modes of the decompressed version of the video signal. In response to the first presentation mode, the special effects generator presents the decompressed version of the video signal including the special effect frame, produced by performing the indicated special effect operation, in place of said first frame. In response to the second presentation mode the special effects generator presents the decompressed version of the video signal with the first frame and without the special effect frame.

DETAILED DESCRIPTION OF THE INVENTION

SINGLE MEMORY SPECIAL EFFECTS AND COMPRESSION ARCHITECTURE

Figure 1:
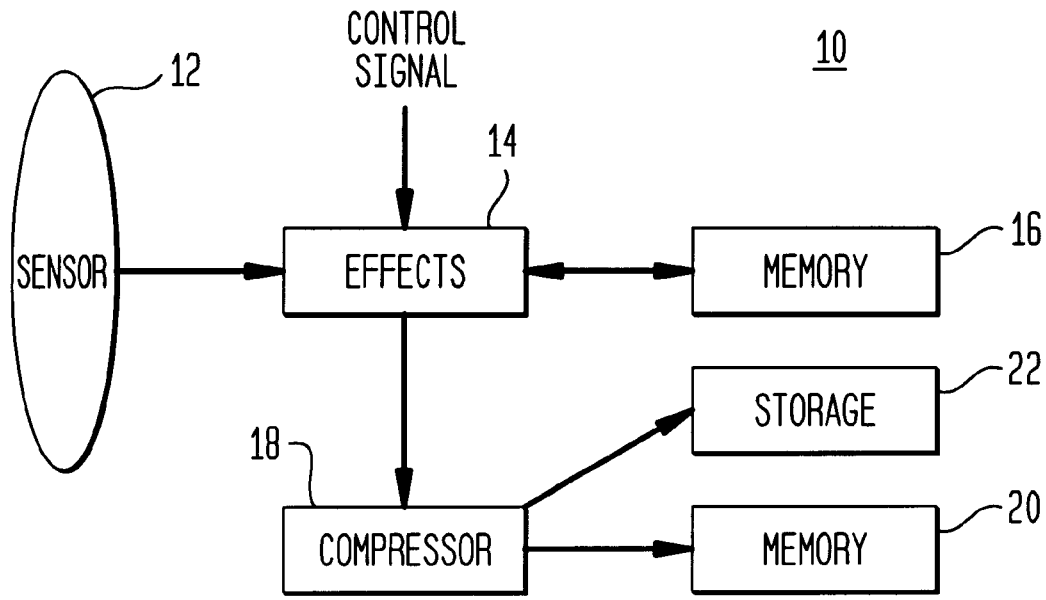
FIG. 1 shows a prior art video recording system.
Figure 2:
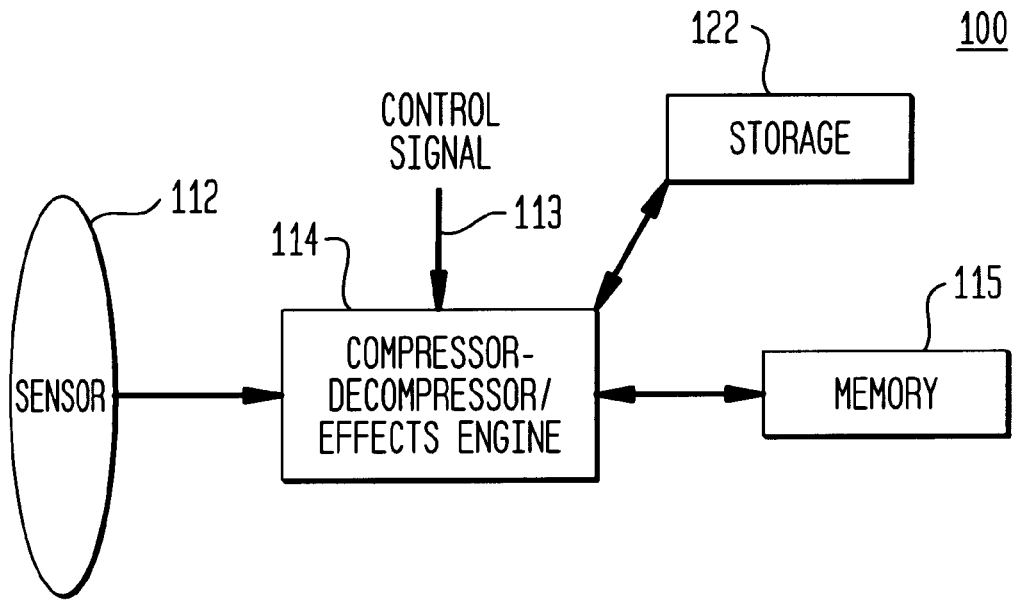
FIG. 2 shows a video recording and effects system according to an embodiment of the present invention.

FIG. 2 shows an exemplary video recording and special effects generation system 100 according to an embodiment of the invention. Illustratively, the system 100 is a camcorder, although the system can be implemented using separable, non-application specific sub-units such as a camera connected to a computer station by a cable. Also, the system 100 is illustrated using the MPEG-2 compression standard and frame based compression is presumed (except as described below). Of course, the system can compress the video according to any standard (or a selectable one of a choice of standards) and field-based compression may be presumed.

Light signals representing images impinge on a sensor 112, such as a photo-tube, charge coupled device or CMOS photo sensor, and are converted to an electrical video signal organized into video frames. Preferably, the video signal is a digital video signal devoid of synchronizing signals, although such synchronizing signals can be stripped off and the video signal can be digitized, if necessary. The video signals are received at combined compressor-decompressor/special effects generator engine 114. Illustratively, such a device can be implemented using one or more special purpose processors such as the DV Expert™ video encoder processor integrated circuit, distributed by C-Cube Microsystems, Inc.™, a company located in Milpitas, Calif. Each uncompressed frame of the video signal may be temporarily stored in a memory 115 pending special effects processing and compression. A signal is received by a control signal input 113 indicating a desired special effect to be performed on the video frames. In response, the processor 114 performs the requested special effect and compresses the frame. The compressed frame is then recorded on the high capacity storage device 122, which can be a video tape recorder, magnetic disk or optical disc. Herein, information is recorded by such a storage device 122 on any kind of storage medium or record carrier, such as a magnetic tape, fixed or removable magnetic disk, optical disc (e.g., CD, magneto optical disc or DVD) etc.

Preferably, the processor 114 is a multi-processor unit including a separate motion estimation unit, video DSP and control RISC processor. The motion estimation unit is a special purpose section for identifying prediction macroblocks for each macroblock given the to-be-compressed macroblock and a search window of pixel data (of a selected reference picture) to search. The results produced by the motion estimation unit are made available to the RISC processor which provides selected motion vectors to the video DSP. The video DSP uses the selected motion vectors to read in the prediction macroblocks and subtract prediction macroblocks from respective to-be-compressed macroblocks. The video DSP can also perform discrete cosine transformation, quantization, run-level and variable length coding on prediction macroblocks and intracoded macroblocks. In a decompression mode, the video DSP can also perform the inverse of each of these operations. The video DSP also formats the compressed video data according to the appropriate syntax. The video DSP furthermore generates statistical data on the number of bits used to compress each frame, which statistics can be provided to the RISC processor for use in making decisions on how to control different aspects of the compression. The RISC processor can control different aspects of compression such as the bit allocation to each picture, quantization scale factor for each macroblock, group of picture structure, picture coding type (i.e., field or frame), motion estimation search window dimensions, as well as other aspects, by issuing appropriate instructions to the motion estimation unit and video DSP.

Figure 3:
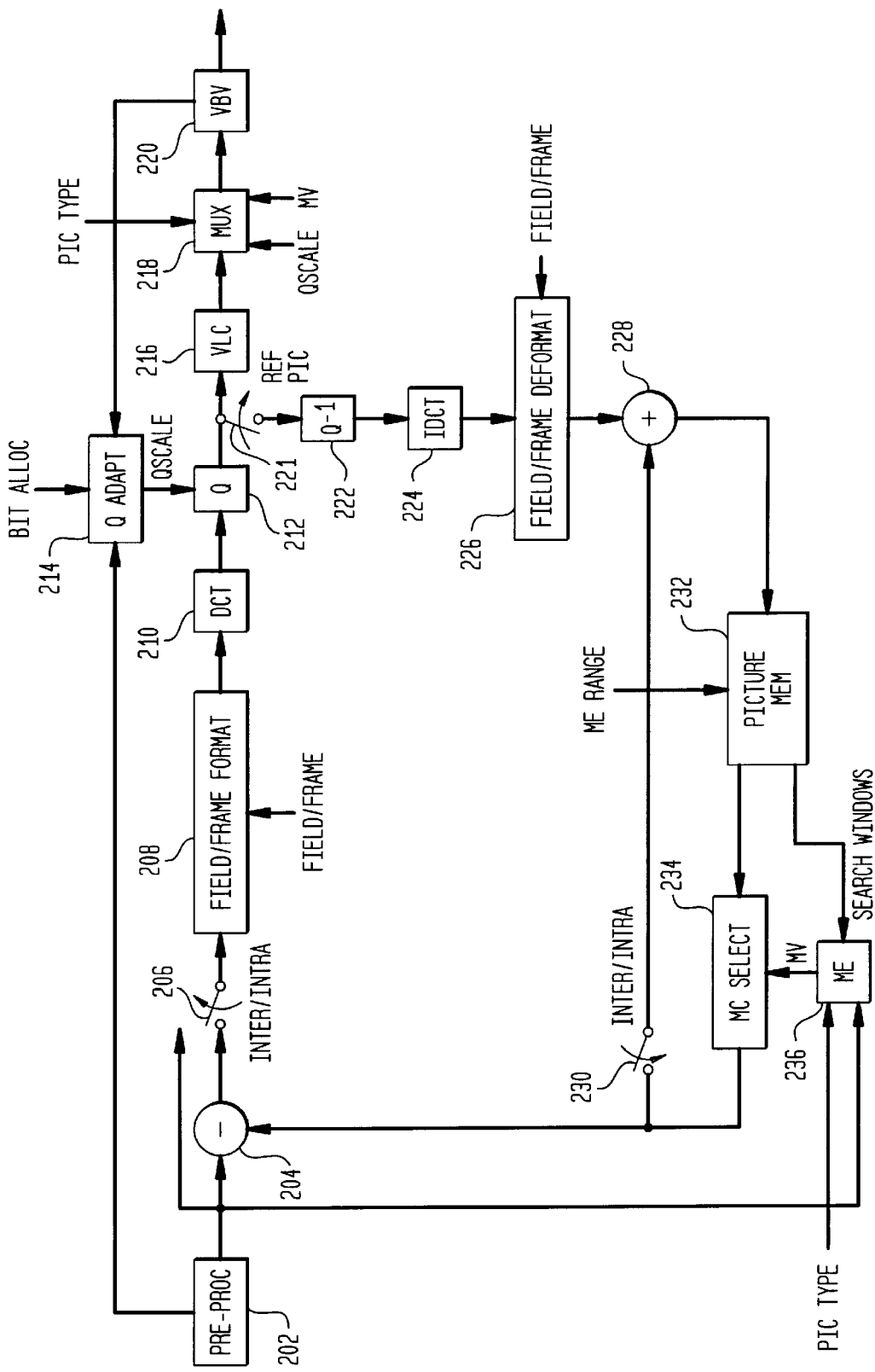
FIG. 3 shows a compressor implemented by the processor of FIG. 2.

FIG. 3 shows an illustrative compression/encoding flow path which describes the processing by the processor 114.

Inputted video frame data is pre-processed in a preprocessor 202. This can include special effects processing, statistics generation and formatting of the frame data into macroblocks. If a macroblock is predictively compressed, a prediction macroblock is subtracted therefrom in subtractor 204 and the prediction error macroblock formed in this fashion is spatially compressed. Otherwise, the original macroblock from the frame is only spatially compressed. This decision is represented by a switch 206 controlled by an intracoding/intercoding signal or indication. The intracoding/intercoding decision is made (by the processor 114) depending on the type of picture type (I, P or B) from which the macroblock originated, whether or not an adequate prediction macroblock can be found for the to-be-compressed macroblock or some other criterion.

If necessary, the macroblock may be changed from frame format to field format in field/frame formatter 208 based on a field/frame decision signal or indication (generated by the processor 114). Each block of the formatted macroblock is discrete cosine transformed in DCT 210 and then quantized in quantizer 212. The quantizer 212 is controlled by, amongst other things, a quantization scale factor outputted from quantizer adaptor 214. Quantizer adaptor 214 controls the quantization based on a bit allocation for the to-be-compressed picture provided by the processor 114, a fullness of the output bitstream buffer 220 and possibly other statistics generated by the pre-processor 202. Quantized macroblocks are variable length encoded by VLC 216 and multiplexed with other control and header data in multiplexer 218. The multiplexed frame data formed in this fashion may be "placed" in the output bitstream buffer 220. Information on the fullness of the output bitstream buffer 220 is provided to the quantizer adaptor 214.

If the macroblock data is from a reference picture, the macroblock data is also outputted from the quantizer 212 to an inverse quantizer 222 where the macroblock data is dequantized. The decision as to whether or not the macroblock data is from a reference picture is represented by switch 221 controlled by a reference picture signal or indication (provided by the processor 114). The inverse quantized macroblock data is inverse discrete cosine transformed by IDCT 224. If necessary, the macroblock data is restored to frame format in field/frame deformatter 226 under control of a field/frame signal or indication (provided by the processor 114).

Next, if the macroblock data is actually prediction error macroblock data, the correct prediction for the macroblock is added to this macroblock data in adder 228. If not, nothing is added to the macroblock data. The decision of whether or not to add prediction data to the macroblock data is represented by switch 230 controlled by the intracoded/intercoded signal or indication (provided by the processor 114). The macroblock data is then stored in the picture memory 232.

If motion compensated prediction is permitted on a to-be-compressed picture, each macroblock is also outputted from the pre-processor 202 to the motion estimation unit 236. Based on the type of picture, the motion estimation unit performs a motion estimation search in each permissible reference picture. A search window of a particular size as dictated by a motion estimation range parameter (provided by the processor 114) is extracted from each reference picture by the motion estimation unit 236. The motion estimation unit 236 examines various candidate prediction macroblocks in each search window and selects the best matching prediction macroblock therein for the to-be-compressed macroblock. The motion estimation unit 236 also generates a score indicating how well the best matching macroblock of a given search window matches the to-be-compressed macroblock. The motion vector for each best matching macroblock and score are outputted from the motion estimation search unit 236 to a motion compensation selector 234. The motion compensation selector 234 selects the prediction macroblock(s) deemed to produce the lowest amount of coded data (e.g., based on the scores). The prediction macroblock(s) identified by its (their) respective motion vector(s) are retrieved, e.g., from the picture memory 232 and are outputted to the subtractor 204 and the adder 228. In the alternative, a decision can be made to nevertheless perform intracoding only, in which case no prediction macroblock is outputted.

The following is a description of the types of special effects that can be selected by applying an appropriate control signal on the input 113. A dissolve from a still frame to another scene can be selected, for example, by the user pressing an appropriate button on the camcorder or through appropriate software. As noted above, the selection is communicated to the processor 114 by a control signal on the input 113. A previously captured frame $F_p$ is either maintained in memory 115 or else retrieved from the storage device 122, decoded by the processor 114 and stored in memory 115. For example, a user might record one scene, hit a "pause" button, and then begin recording a second scene. In such a case, the last captured frame from the first scene is preferably maintained in memory 115. If the user selects a dissolve operation when beginning to capture the second scene, the last captured frame from the first scene is already present in memory. (If the dissolve operation is not selected, the previously stored trailing sequence of frame from the first scene can be discarded.)

Next, real-time capture of video frames of a new sequence $F_r$ commences. As each frame $F_r(t)$ is captured, it is stored in memory 115. For the first captured frame of the second scene, the video processor 114 creates a special effects processed frame $F_{se}(t)=(1-\alpha(t))\cdot F_r(t)-\alpha(t)\cdot F_p$, where $\alpha(t)$ is a linearly, monotonically decreasing function equal to 1 at time t=0 and equal to 0 at time $t=t_{dissolve}$, and $F_{se}(t)$, $F_r(t)$ and $F_p$ represent the pixel data of the special effect, recently captured and previously captured frame, respectively.

One special effects processed frame is created for each frame interval during the period that begins at time t=0 and ends at time $t=t_{dissolve}$. Each special effect frame $F_{se}(t)$ thus calculated is compressed and stored. Afterward, the processor 114 simply compresses each recent, real-time captured frame $F_r(t)$ for $t>t_{dissolve}$ and stores such compressed frames for presentation following the sequence of compressed special effects frames $F_{se}(t)$.

In an alternative embodiment, for the period of the dissolve, the recent, real-time captured sequence $F_r(t)$ is not stored in the memory 115 during the dissolve. Rather, as the captured sequence enters the processor 114, the frame $F_p$ is retrieved from the memory 115 and the special effects frame $F_{se}(t)$ is formed and then stored to the memory 115, from which it is retrieved later for compression processing. This alternative embodiment does not require as much data transfer bandwidth between the processor 14 and the memory 115 as the first embodiment. On the other hand, the second embodiment requires special hardware for handling real time capture and special effects processing.

A fade in or fade out special effect may be treated in a similar fashion to a dissolve. In operation, the user specifies a fade in or fade out via control signal input 113. A fade in is illustratively specified at the commencement of recent, real-time frame capture, and a fade out is illustratively specified at the end of recent, real-time frame capture. Real time capture of video frames $F_r(t)$ commences, in the case the user specifies a fade in, or is already in progress, in the case the user specifies a fade out. As each recently, real-time captured frame $F_r(t)$ is captured, it is stored in memory 115 for special effects processing and compression. The processor 114 then creates each special effect processed frame $F_{se}(t)=(1-\alpha(t))\cdot F_r(t)+\alpha(t)F_{uniform}$ in the case of a fade in or $F_{se}(t)=\alpha(t)\cdot F_r(t)+(1-\alpha(t))\cdot F_{uniform}$, in the case of a fade out, where $F_{uniform}$ is a frame of uniform intensity and/or color from which, or to which, respectively, the fade is to occur. In the case of a fade to or from "black," the frame data of $F_{uniform}$ is all zero frame data and the above formulas can be simplified to $(1-\alpha(t))\cdot F_r(t)$ for a fade in and $\alpha(t))\cdot F_r(t)$ for a fade out.

As each special effects frame $F_{se}(t)$ is calculated, it is compressed by the processor 114. Each special effects processed frame is then stored in the storage device 122. Unlike a dissolve, frames of the previously stored sequence $F_r$ are neither used for special effects processing nor replaced. After the fade in is complete (at time $t>t_{fade}$) normal video frame capture, compression and storage is performed by the processor 114 and storage device 122. After the fade out is complete (at time $t>t_{fade}$), recent, real-time capture, compression and storage of video frames ceases.

In an alternative embodiment, for the period of the fade, the recent, real time captured sequence $F_r(t)$ is not stored in the memory 115 during the fade. Rather, as the captured sequence enters the processor 114, the special effects frame $F_{se}(t)$ is formed and then stored to the memory 115, from which it is retrieved later for compression processing. This alternative embodiment does not require as much data transfer bandwidth between the processor 14 and the memory 115 as the first embodiment. On the other hand, the second embodiment requires special hardware for handling real time capture and special effects processing.

A wipe from a still frame to another scene can be selected, for example, by the user pressing an appropriate button on the camcorder or through appropriate software. As noted above, the selection is communicated to the processor 114 by a control signal on the input 113. A previously captured frame $F_p$ is either maintained in memory 115 or else retrieved from the storage device 122, decoded by the processor 114 and stored in memory 115. For example, a user might record one scene, hit a "pause" button, and then begin recording a second scene. In such a case, the last captured frame from the first scene is preferably maintained in memory 115. If the user selects a wipe operation when beginning to capture the second scene, the last captured frame from the first scene is already present in memory. (If the wipe operation is not selected, the previously stored last frame from the first scene can be discarded.)

Next, real-time capture of video frames of a new sequence $F_r$ commences. As each frame $F_r(t)$ is captured, it is stored in memory 115. The processor 114 forms a special effects frame $F_{se}(x,y,t)=\beta(x,y,t)\cdot F_p(x,y)+|\alpha(x,y,t)-1|\cdot F_r(x,y,t)$, where $F_p(x,y)$ is a pixel at coordinates $(x,y)$ of the previously stored frame $F_p$, $F_r(x,y,t)$ is a pixel at coordinates $(x,y)$ in frame t of the recently capture sequence of frames $F_r$ and $\beta(x,y,t)$ is a mask function equal to 1 to indicate that a pixel of the previous sequence of frames $F_p$ should be outputted in the corresponding $(x,y)$ coordinate of the special effects frame $F_{se}$ and equal to 0 to indicate that a pixel of the recently captured sequence $F_r$ should be outputted in the special effects frame $F_{se}$. $\beta(x,y,t)$ is 1 for each pixel $(x,y)$ at $t=0$ and gradually transitions to 0 for each pixel $(x,y)$ in the time interval from $t=1$ to $t=t_{wipe}$.

Each special effect frame $F_{se}(t)$ thus calculated is compressed and stored. Afterward, capture, compression and storage of recent, real-time captured frames $F_r(t)$ for $t>t_{wipe}$ occurs normally.

In an alternative embodiment, for the period of the wipe, the recent, real time captured sequence $F_r(t)$ is not stored in the memory 115 during the wipe. Rather, as the captured sequence enters the processor 114, the special effects frame $F_{se}(t)$ is formed and then stored to the memory 115, from which it is retrieved later for compression processing. This alternative embodiment does not require as much data transfer bandwidth between the processor 14 and the memory 115 as the first embodiment. On the other hand, the second embodiment requires special hardware for handling real time capture and special effects processing.

A graphics overlay operation can generate a special effects frame $F_{se}(x,y,t)=\beta(x,y)\cdot F_{ovr}(x,y)+|\beta(x,y)-1|\cdot F_r(x,y,t)$, where $F_{ovr}(x,y)$ is a pixel of an overlay frame. Note here that the mask $\beta$ is only a function of spatial coordinates and does not vary over time.

In operation, the user specifies a graphics overlay as video is being captured via the control signal input 113. The graphics overlay can be in the form of readable characters/symbols which are predetermined (e.g., a date stamp) or user definable. In such a case, the mask function $\beta(x,y)$ need not be a predefined and stored matrix but can be generated in real-time using a character generator. As each recently, real-time captured frame $F_r(t)$ is received in memory, the processor 114 generates a special effects frame $F_{se}(t)$. The special effects frame is then compressed and stored in the storage device 122. A graphics overlay can occur for a predefined time $t_{ovr}$ or a user defined time. After the graphics overlay, i.e., at time $t>t_{ovr}$, capture, compression and storage of the recent, real-time captured frames $F_r$ is performed in an ordinary fashion by the processor 114 and storage device 122.

Each of the special effects noted above is a simple linear combination of recent, real-time captured video frame data with other video frame data. In the case of a dissolve or a wipe, the other frame data is data of a previously stored sequence of video frames. In the case of a fade or graphics overlay, the other frame data is simple constant pixel data.

In addition to the above-noted simple special effects, other more complex special effects can be performed. For instance, in the description above, the dissolve, wipe and fade in special effect operations are performed on a single trailing frame of a previously stored video scene and an initial or leading frame of a recent, real-time captured video scene, or a trailing frame of the recent, real-time captured video scene, in the case of a fade out. However, each of these operations may be performed over a sequence of multiple trailing frames of a previously stored video scene and multiple leading or trailing frames of a recent, real-time capture scene. For example, the last $t_{dissolve}$ seconds of a previously recorded scene can be dissolved with the first $t_{dissolve}$ seconds of a recent, real-time captured video scene.

Another, more complex special effect involves spatially varying the blending of pixel data of two frames. For example, the wipe special effect described above is a "hard" wipe wherein each pixel of the special effect frame entirely originates from only one of the two input frames from which the special effect frame is derived. However, in other types of wipes, one or more pixels in the special effect frame may be a linear combination of pixel data from each of the input frames. In such a case, the mapping function β(x,y,t) takes on values between 0 and 1. In another variation on this, a graphics overlay special effect operation is performed where the edges of each character or symbol to be overlaid on the recent, real-time captured frame are blended with the adjacent pixels or the pixels on which such edge pixels are to be overlaid. This tends to create a more visually appealing special effect frame.

Another more complex special effect operation involves scaling one or more frames and then combining the scaled video frames with each other and/or a non-scaled frame. For example, a "picture-in-picture" special effect can be achieved by scaling (subsampling) one video frame. The subsampled video frame is then overlaid onto a specific location of a second video frame. In an even more complex variation, a picture in picture wipe is achieved over a sequence of special effects frames (each of which is derived from two or more input frames, each input frame originating from a different $t_{wipe}$ second long sequence of frames) by steadily increasing the size of the overlaid picture-in-picture window until it fills the entire screen.

Yet another complex special effect is a warping of one frame prior to combination with one or more other frames. A warping special effect is similar to scaling a frame. However, in the case of a warping, the scale factor applied to the pixel data of the frame varies over the pixel spatial coordinates of the frame. This tends to distort or warp the image depicted therein. In a more complex warp, the pixel data of the frame is treated in an analogous fashion as "texture data" cast or "mapped" in three-dimensional space onto a geometric surface (e.g., a sphere, square, saddle, etc.) Such a mapping involves a scaling of the pixel data of the frame. The three-dimensional surface, with the scaled pixel data mapped thereon, is then, itself, mapped onto, or blended with the pixel data of, another frame which is coplanar with a plane of view of the three-dimensional surface.

VARYING COMPRESSION BASED ON A SELECTED SPECIAL EFFECT

When special effects processed frames are subsequently compressed, noticeable compression artifacts may be introduced into the compressed video frames. It is desirable to use a priori knowledge that a special effect has been added to a video frame, and the type of the added special effect, to adjust the compression to avoid introducing artifacts or to reduce the impact of such artifacts, in the compressed video frames.

According to a second embodiment, a technique is provided for varying the compression performed on the special effects frames in accordance with the special effects applied to the frames. The following is a an illustrative list of aspects of the compression that can be varied:

(1) Bit allocation: For example, it is advantageous to allocate more bits to special effects frames of a dissolve or fade. This is because compression artifacts are more noticeable during such special effects.

(2) Motion estimation range: For example, in special effects frames of a dissolve or a fade it is advantageous to reduce the dimensions of the search window of the reference frames in which a search for a prediction is made. During fades and dissolves, it is difficult to find a suitable matching prediction macroblock for each to-be-compressed macroblock. Specifically, the frame to frame reduction in luminance makes it difficult to find a suitable matching prediction macroblock that produces a small prediction error. As such, it is less likely to find a good prediction that has shifted by a large spatial distance between frames under such circumstances.

(3) Change the group of pictures structure: For example, over a sequence of special effects frames of a dissolve or wipe, it is desirable to reduce the temporal distance between predicted pictures and the reference pictures from which they are predicted. To that end, the number of bidirectional (B) frames between reference frames is reduced. For instance, instead of encoding the sequence of pictures with two B frames between each reference frame (i.e., BBIBBPBBP . . . ) only a single frame is encoded as a B frame between each reference picture (i.e., BIBPBP . . . ) or no frames are encoded as B frames (IPPPP . . . ).

(4) Change the picture structure: For example, in special effects frames of a dissolve or fade, it may be desirable to compress each field of the frame separately, as field pictures. This is particularly useful when the original captured source video is interlaced scanned, i.e., each field is captured at different successive moments in time. Generally, there is a high correlation between the fields, especially when the motion of images in the frames is low, and thus frame compression is preferred. However, during a fade or dissolve, the field to field correlation is substantially lower and a better compression can often be achieved if field compression is used instead of frame compression.

(5) Adjust the quantization scale factor: For example, in portions of special effects frames of a graphics overlay, it is often desirable to reduce the quantization scale factor (to quantize more finely, i.e., with more gradations or steps). This is because a graphics overlay is typically an overlay of artificially generated characters which have sharp transition edges. Normal quantization imposed by a typical compression control has a tendency to reduce the image quality by producing a ringing or shimmering effect around such edges. It is desirable to preserve the sharp edges or transitions so that the characters are legible. To do so, the quantizer scale factor is reduced so that quantization occurs more finely.

Each of these variations in compression can be achieved through suitable instructions executed by the processor 114. Specifically, each time a special effect is selected via control signal input 113, the processor 114 adjusts one or more of: the picture types and numbers in the group of pictures, the bit allocation to each frame, the search window size, the selection of field or frame based compression, and/or the quantizer scale factor.

NONDESTRUCTIVE SPECIAL EFFECTS GENERATION

A problem with the generation of special effects is the irreversible loss of the original frame data. Such a loss is easily prevented in the case of a simple graphics overlay. Specifically, the graphics information to be overlaid on the frames is maintained in the signal or on the storage medium in a separate location. During decoding, the frames can be decoded in original form. The graphics data can be selectively overlaid on the frames prior to presentation, or the frames can be presented without the graphics overlaid thereon at the option of the operator.

However, heretofore, no such provision has been provided for preventing the irretrievable loss of frame data for other special effects where the data of two frames are combined to produce a special effects frame (in the case of a dissolve or wipe) or where the pixel data is scaled (i.e., in magnitude, as in the case of a fade, or in space, as in the case of a warp, picture in picture, etc.). In the case of a fade, the loss is limited to the recent, real-time captured frames. In the case of a dissolve or wipe, the loss is incurred by both recent, real-time captured frames and previously stored frames.

According to a third embodiment, a technique is provided for preserving the original frame data to allow either reproduction of the unmodified frame data prior to, i.e., without, adding special effects or reproduction of the frame data as modified by the special effects. Specifically, information pertaining to the added special effect is provided in the bitstream containing the compressed video signal. Preferably, the special effect is identified but not performed on the source video signal(s) at the time of compression. Instead, sufficient information for performing the special effect during decompression is inserted into the bitstream. This information consists of: (1) a first compressed frame of a video signal, and (2) information, such as pixel data of a second frame (in compressed or uncompressed form) to be combined with the decompressed pixel data of the first frame, or one or more scaling factors (e.g., pixel intensity/magnitude scaling factors, pixel spatial filter coefficients/spatial scaling factors). The information also indicates the special effect to be performed on the decompressed pixel data of the first frame and the first information. The information can include an additional indicator specifying the special effects operation. Alternatively, if only a single special effect is ever permitted, or the type of information present uniquely identifies the special effect (e.g., a fade requires only the scale factor, whereas a dissolve requires both a scale factor and pixel data of an additional frame), then the indication of the special effect is achieved by the mere presence of the pixel data and/or scale factor(s) and no separate indication need be provided for specifying the special effect operation. A special decompressor, which is capable of performing the special effect, reads the embedded special effect information. In response, the decompressor decompresses the compressed video signal(s) and presents the decompressed video signal in one of two manners or modes. According to a first mode, the decompressor substitutes the special effect frame produced by combining the decompressed pixel data of the first frame with the first information. According to a second mode, the decompressor does not substitute the special effect frame for the first frame; instead, the first frame is presented within the decompressed video signal and the special effects frame is omitted (or not created). The decompressor thus has the capability of dynamically performing the special effect operation in response to the above noted information.

Consider first the fade. Instead of scaling the luminosity of each frame by α(t) prior to compression, the processor 114 stores the particular scale factor α(t) to be applied to each frame with its respective frame. That is, each frame, having pixel data to be multiplied by a corresponding scale factor α(t), is compressed prior to performing the special effect and the scale factor α(t) to be used in scaling the magnitude of each pixel of that respective frame is multiplexed into the bitstream. The processor 114 also inserts into the bitstream an indication to perform a fade.

For both dissolve and wipe special effects, the total number of frames in the two video signals to be transitioned prior to special effects processing exceeds the total number of frames after adding the special effect. This can be handled as follows. First, the special effects processing is not performed at the time of compression. Rather, the processor 114 compresses the frames of each sequence separately. Both sequences are stored in the storage device 122, e.g., successively. The processor 114 inserts into the bitstream sufficient information for performing the special effect. For example, in the case of a dissolve, an indication to perform a dissolve special effect, and the scale factors α(t) (or both scale factors, if the scale factors are independent) associated with each group of frames, to be combined together in the dissolve operation to form each special effects frame, are provided. In the case of a wipe, an indication to perform a wipe and the mapping function β(t) for each group of frames, to be combined together in the wipe operation to form each special effects frame, is provided. Note, in some dissolves, the change in scale factor(s) may be a well known and simple formula. Likewise, in some wipes, the mapping function is a simple geometric formula. In such cases, it may be more desirable to provide the formula, to conserve bandwidth.

The system 100 can be modified to compress video signals and to format them with the appropriate special effects information noted above. Moreover, the processor 114 can respond to each special effect specified on the control input 113 by producing the appropriately formatted bitstream and/or storing the appropriate information needed for performing the special effect in the storage device 122.

As noted above, extra information is inserted into each bitstream according to this embodiment. The information may be inserted, for example, in the user data sections of the encoded frames (e.g., the encoded frames to be combined or scaled to produce the respective special effects). Alternatively, or additionally, such information is stored as auxiliary data, e.g., as a private elementary stream. In the case of a program stream, the private stream information can be multiplexed into the packs containing the compressed video signal(s). However, such information is preferably placed into separate packs which packs are interleaved with the packs containing the compressed video signal(s). Each pack is stored in a sector storage area of the DVD disc. This accords with the DVD standard wherein each pack contains compressed information for only one elementary stream. In either case, each such private stream bearing pack is labeled with a stream identifier indicating that its contents are private.

In the case of a transport stream, the private stream information is placed in separate transport packets which have a packet identifier uniquely assigned to the private stream over the entire transport stream. These private stream bearing transport packets are then multiplexed into the transport stream which carries the compressed video signal(s).

Figure 4:
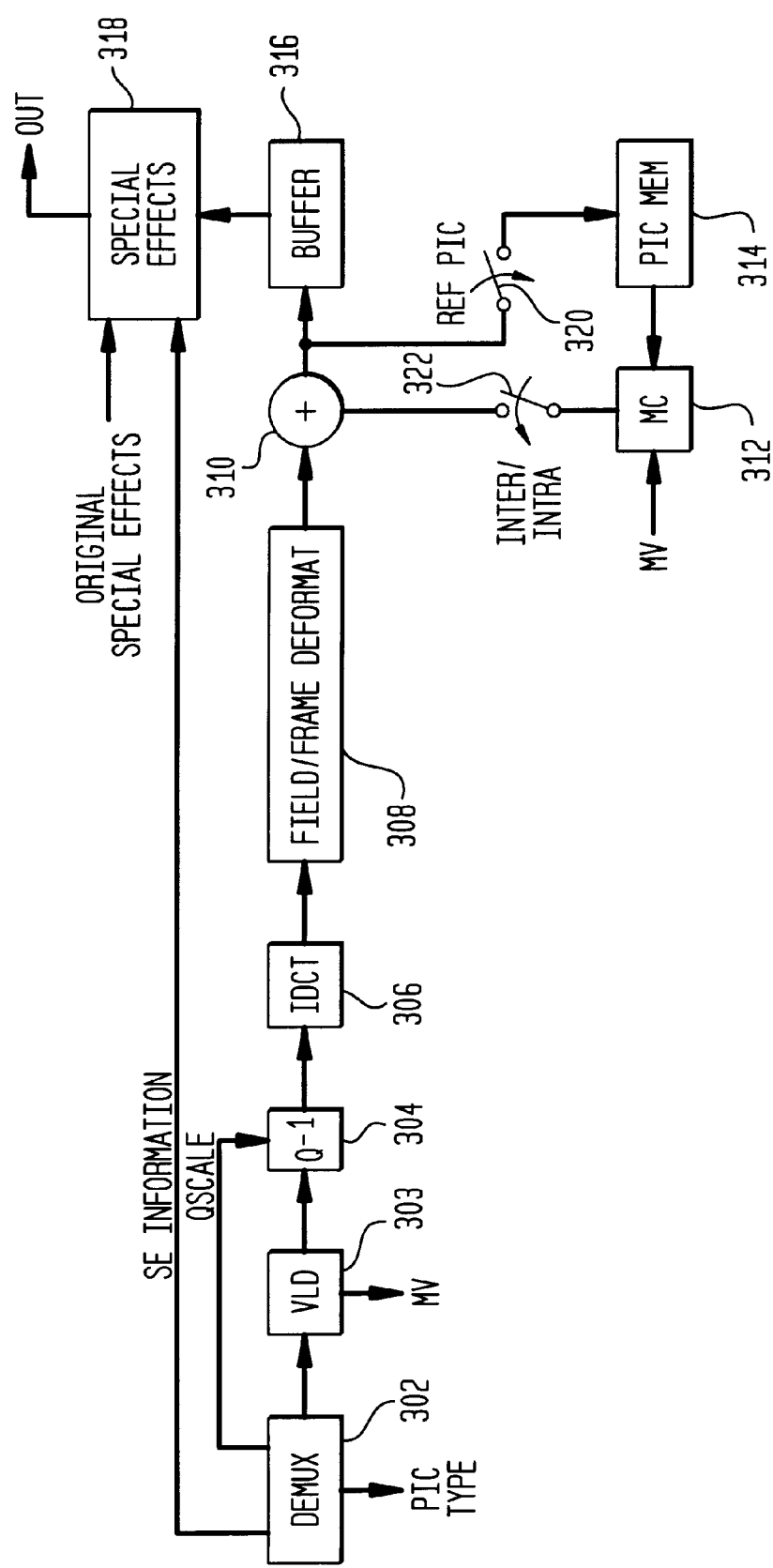
FIG. 4 shows a decompressor according to an embodiment of the invention.

FIG. 4 shows a decompressor/special effects flow diagram according to an embodiment of the present invention. Illustratively, the decompressor flow diagram is implemented using the system 100. In the alternative, the decompressor flow diagram can be achieved by connecting any standard video decompressor and demultiplexer to a special effects processor. In the former case, the processor 114 (FIG. 3) must be programmed to recognize one or more decompressed video signals, and special effects information added thereto according to this invention, and selectively perform the special effects indicated by such information.

The compressed formatted bitstream is received at a demultiplexer 302 from a storage device (such as storage device 122) or a communications medium. The demultiplexer 302 demultiplexes certain compression control information, such as quantizer scale factors, picture coding types, intracoded/intercoded indicators, etc. In addition, the demultiplexer 302 is capable of identifying user information pertaining to special effects generation. Such information is demultiplexed and outputted to a special effects generator processor 318.

Compressed macroblock data is variable length decoded in VLD 303. The frame data is then inverse quantized in inverse quantizer 304 and inverse discrete cosine transformed in IDCT 306. If the macroblock data is outputted in field format, the macroblock data is reformatted in frame format in frame/field deformatter 308. The macroblocks are then outputted to adder 310. If the macroblocks are prediction error macroblocks (as indicated by a intercoded indication demultiplexed therefor by the demultiplexer 302), then a prediction macroblock is outputted to the adder 310. Otherwise, no additional addend is provided to the adder 310. The decision of whether or not to output a prediction macroblock is represented by the switch 322 under control of an intercoded/intracoded signal or indication. The adder 310 outputs decompressed macroblock data which may be reformatted into frame data in the buffer 316.

Meanwhile, decompressed macroblock data of reference pictures (as indicated by picture type information demultiplexed by demultiplexer 302) outputted from the adder 310 is also stored in the picture memory 314. The decision whether or not to store macroblock data is represented by switch 320 controlled by a reference picture signal or indication. A motion compensator 312 responds to motion vector data decompressed and other indications extracted from the bitstream by retrieving the appropriate prediction macroblock from the picture memory 314. Such a prediction macroblock is outputted to the adder 310 for addition to the decompressed prediction error macroblock to which it corresponds.

Illustratively, the decoder shown in FIG. 4 has sufficient processing speed to decode two frames in a single frame time, if necessary.

The special effects processor 318 responds to special effects information demultiplexed from the bitstream and an original/special effects mode signal or indication as follows. If original mode is selected, then the special effects processor 318 outputs the decompressed frames from the buffer for presentation at the appropriate time without adding special effects thereto. That is, the sequence of video frames is decompressed and the decompressed sequence of video frames is presented as captured. Thus, no special effects frames are substituted for any of the decompressed frames, which depict each scene as captured.

If special effects mode is selected, then the special effects processor 318 responds as follows. If no special effects information is demultiplexed, then each successive decompressed frame is outputted from the buffer 316 at the appropriate time for presentation. If special effects information is present, then the special effects processor 318 obtains the decompressed versions of the frames on which special effects are to be performed, the corresponding additional information (second frame pixel data or scale factor(s)) to be combined therewith and the indication of the special effect operation to be performed thereon. The special effect processor 318 then combines the additional information with the respective decompressed frames according to the indication of the special effects operations to be performed. For example, suppose that an indication is demultiplexed from the bitstream which specifies that a fade special effect operation is to be performed on a designated frame. In such a case, the special effects processor 318 obtains the information indicating the scale factor α(t) by which the magnitude of the pixel data of the designated frame is to be scaled. The special effects processor 318 scales the decompressed pixel data of the designated frame with its respective scale factor α(t) prior to outputting the frame. The special effects processor 318 then outputs the special effects frame thus produced instead, i.e., in place of, the designated decompressed frame In the case of a dissolve, the special effects processor 318 retrieves the decompressed frame and the information to be combined therewith, namely, pixel data of a second frame, which can be decompressed from the bitstream or present in noncompressed form, and scale factors α(t). The special effects processor 318 applies the respective scaling to the pixel data of each frame and then adds the scaled frames together to produce the special effects frame. Again, the special effects processor 318 substitutes the special effects frame thus produced in place of the designated frame. Finally, in the case of a wipe, the special effects processor 318 retrieves the decompressed frame and the information to be combined therewith, namely, the pixel data of a second frame, and the mapping function β(t). The special effects processor 318 determines which pixels to select from each frame by applying the mapping β(t) function thereto, and then combining the selected pixels of the pair of frames into a single special effects frame. The frame thus formed is then outputted in place of the decompressed frame.

The above discussion is intended to be merely illustrative of the invention. Those having ordinary skill in the art may devise numerous alternative embodiments without departing from the spirit and scope of the following claims.

What is claimed is:

1. A video program bearing bitstream comprising:
    (a) compressed pixel data of a first frame of a video signal,
    (b) information comprising either pixel data of a second frame or a single scaling value to be used to scale plural pixel data of a frame, said information indicating a special effect operation by which said first frame is irreversibly transformed to a special effect frame by combining decompressed pixel data of said first frame with said information,
        said video program bearing bitstream being decompressible in a first manner to reproduce a decompressed video signal including said special effect frame, produced by performing said indicated special effect operation, in place of said first frame, or in a second manner to produce a decompressed version of said video signal with said first frame and without said special effect frame.

2. A storage medium on which is stored a bitstream bearing a video program, said storage medium comprising:
    (a) a first storage area for storing compressed pixel data of a first frame of a video signal,
    (b) a second storage area for storing a first information comprising either pixel data of a second frame or a single scaling value to be used to scale plural pixels of a frame, said information indicating a special effect operation by which said first frame is irreversibly transformed to a special effect frame by combining decompressed pixel data of said first frame with said first information,
        said video program bearing bitstream being decompressible in a first manner to reproduce a decompressed video signal including said special effect frame produced by performing said indicated special effect operation in place of said first frame, or in a second manner to produce a decompressed version of said video signal with said first frame and without said special effect frame.

3. A system for capture and compression of an original uncompressed video signal which enables decoding and reversible reconstruction of a decompressed version of said original video signal comprising:

(a) an input for receiving a signal indicating a special effect operation by which a first frame of a video signal is irreversibly transformed to a special effect frame by combining decompressed pixel data of said first frame with information comprising either pixel data of a second frame or a single scaling value to be used to scale plural pixels of a frame, and (b) a processor for compressing pixel data of said first frame, said processor also for constructing a bitstream containing said compressed pixel data of said first frame and said information, said information indicating said special effect operation which can be performed on decompressed pixel data of said first frame to produce a special effect frame, said video program bearing bitstream being decompressible in a first manner to reproduce a decompressed video signal including said special effect frame, produced by performing said indicated special effect operation, in place of said first frame, or in a second manner to produce a decompressed version of said video signal with said first frame and without said special effect frame.

4. The system of claim 3 wherein said special effect operation is a fade and wherein said information comprises a scaling value indicating a change in brightness to be applied to said decompressed pixel data of said first frame to produce said special effect frame.

5. The system of claim 3 wherein said special effect operation is a dissolve to a second video signal and wherein said information includes pixel data of a second frame of said second video signal.

6. The system of claim 3 wherein said special effect operation is a wipe to a second video signal and wherein said information comprises pixel data of a second frame of said second video signal and information indicating which pixels to select from each of said decompressed first frame and said second frame to form said special effect frame.

7. A method for capture and compression of an original uncompressed video signal which enables decoding and reversible reconstruction of a decompressed version of said original video signal comprising:

(a) receiving a signal indicating a special effect operation by which a first frame of said video signal is irreversibly transformed to a special effect frame by combining decompressed pixel data of said first frame with information comprising either pixel data of a second frame or a single scaling value to be used to scale plural pixels of a frame, (b) compressing pixel data of said first frame, and (c) constructing a bitstream containing said compressed pixel data of said first frame, and said information, said information indicating a special effect operation which can be performed on a decompressed pixel data of said first frame to produce a special effect frame, said video program bearing bitstream being decompressible in a first manner to reproduce a decompressed video signal including said special effect frame, produced by performing said indicated special effect operation, in place of said first frame, or in a second manner to produce a decompressed version of said video signal with said first frame and without said special effect frame.

8. The method of claim 7 wherein said special effect is a fade and wherein said information comprises a scaling value indicating a change in brightness to be applied to said decompressed pixel data of said first frame to produce said special effect frame.

9. The method of claim 7 wherein said special effect is a dissolve to a second video signal and wherein said information includes pixel data of a second frame of said second video signal.

10. The method of claim 7 wherein said special effect is a wipe to a second video signal and wherein said information comprises pixel data of a second frame of said second video signal and information indicating which pixels to select from each of said decompressed first frame and said second frame to form said special effect frame.

11. A method for decompressing a bitstream comprising the steps of:

(a) demultiplexing from said bitstream compressed pixel data of a first frame of a video signal and information comprising either pixel data of a second frame or a single scaling value to be used to scale plural pixel data of a frame, said information indicating of a special effect operation by which said first frame is irreversibly transformed to a special effect frame by combining decompressed pixel data of said first frame with said information, (b) decompressing said pixel data of said first frame to produce decompressed pixel data of said first frame, (c) receiving a mode signal specifying one of two presentation modes of said decompressed frame data, (d) in response to a first one of said presentation modes, presenting said decompressed version of said video signal including said special effect frame, produced by performing said indicated special effect operation, in place of said first frame, and (e) in response to a second one of said presentation modes, presenting said decompressed version of said video signal with said first frame and without said special effect frame.

12. The method of claim 11 wherein said special effect is a fade and wherein said information comprises a scaling value indicating a change in brightness to be applied to said decompressed pixel data of said first frame to produce said special effect frame.

13. The method of claim 11 wherein said special effect operation is a dissolve to a second video signal and wherein said information includes pixel data of a second frame of said second video signal.

14. The method of claim 11 wherein said special effect operation is a wipe to a second video signal and wherein said information comprises pixel data of a second frame of said second video signal and information indicating which pixels to select from each of said decompressed first frame and said second frame to form said special effect frame.

15. An apparatus for decompressing a bitstream comprising:

(a) a demultiplexer for demultiplexing from said bitstream compressed pixel data of a first frame of a video signal, and information comprising either pixel data of a second frame or a single scaling value to be used to scale plural pixel data of a frame, said information indicating a special effect operation by which said first frame is irreversibly transformed to a special effect frame by combining decompressed pixel data of said first frame with said information, (b) a decompressor for decompressing said pixel data of said first frame to produce decompressed pixel data of said first frame, (c) a special effects generator for receiving a mode signal specifying one of two presentation modes of said decompressed frame data, said special effects generator responding to a first one of said presentation modes by presenting said decompressed version of said video signal including said special effect frame, produced by performing said indicated special effect operation, in place of said first frame, and responding to a second one of said presentation modes by presenting said decompressed version of said video signal with said first frame and without said special effect frame.

16. The apparatus of claim 15 wherein said special effect is a fade and wherein said information comprises a scaling value indicating a change in brightness to be applied to said decompressed pixel data of said first frame to produce said special effect frame.

17. The apparatus of claim 15 wherein said special effect operation is a dissolve to a second video signal and wherein said information includes pixel data of a second frame of said second video signal.

18. The apparatus of claim 15 wherein said special effect operation is a wipe to a second video signal and wherein said information comprises pixel data of a second frame of said second video signal and information indicating which pixels to select from each of said decompressed first frame and said second frame to form said special effect frame.

* * * * *